US012670303B2

(12) United States Patent
Kayode

(10) Patent No.: US 12,670,303 B2
(45) Date of Patent: Jun. 30, 2026

(54) SYSTEM AND METHOD FOR IMPLEMENTING MACHINE LEARNING FOR 3D GEO-MODELING OF PETROLEUM RESERVOIRS

(71) Applicant: Saudi Arabian Oil Company, Dhahran (SA)

(72) Inventor: Babatope Kayode, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 1363 days.

(21) Appl. No.: 17/171,150

(22) Filed: Feb. 9, 2021

(65) Prior Publication Data

US 2022/0253577 A1 Aug. 11, 2022

(51) Int. Cl.
*G06F 30/27* (2020.01)
*E21B 49/00* (2006.01)
(Continued)

(52) U.S. Cl.
CPC .............. *G06F 30/27* (2020.01); *E21B 49/00* (2013.01); *G01N 15/08* (2013.01); *G01V 1/302* (2013.01);
(Continued)

(58) Field of Classification Search
CPC ...... G06F 30/27; G06F 30/28; G06F 2113/08; E21B 49/00; E21B 2200/20; E21B 2200/22; G01N 15/08; G01V 1/302; G01V 20/00; G01V 1/306; G01V 2210/624; G01V 2210/665
(Continued)

(56) References Cited

U.S. PATENT DOCUMENTS

2014/0379312 A1* 12/2014 DeDontney ............. E21B 43/00
703/2
2019/0257196 A1 8/2019 Kayode et al.
2020/0386908 A1* 12/2020 Saini ...................... G01V 20/00

OTHER PUBLICATIONS

Maucec, M., et al. "Engineering Workflow for Probabilistic Assisted History Matching and Production Forecasting: Application to a Middle East Carbonate Reservoir." SPE Reservoir Characterisation and Simulation Conference and Exhibition. SPE, 2013. (Year: 2013).*

(Continued)

*Primary Examiner* — John E Johansen
(74) *Attorney, Agent, or Firm* — Fish & Richardson P.C.

(57) ABSTRACT

Some implementations provide a method including: accessing measurement data that characterize one or more features of a reservoir, wherein the measurement data are from more than well locations of the reservoir and from a range of depths inside the reservoir; detecting portions of the measurement data that characterize the one or more features with a statistical metric that is below a pre-determined threshold; based on removing the portions of the measurement data, identifying a plurality of layers along the range of depths of the reservoir; within each layer of the plurality of layers, grouping the measurements data among a plurality of clusters, each corresponding to a flow unit (FU) and determined by a machine learning algorithm; generating a three-dimensional (3D) permeability model of the reservoir based on the FU of each layer and a saturation height function; and simulating a performance of the reservoir based on the 3D permeability model.

18 Claims, 17 Drawing Sheets

(51) Int. Cl.

| | |
|---|---|
| *G01N 15/08* | (2006.01) |
| *G01V 1/30* | (2006.01) |
| *G01V 20/00* | (2024.01) |
| *G06F 30/28* | (2020.01) |
| *G06F 113/08* | (2020.01) |

(52) U.S. Cl.
CPC .............. *G01V 20/00* (2024.01); *G06F 30/28* (2020.01); *E21B 2200/20* (2020.05); *E21B 2200/22* (2020.05); *G01V 1/306* (2013.01); *G01V 2210/624* (2013.01); *G01V 2210/665* (2013.01); *G06F 2113/08* (2020.01)

(58) Field of Classification Search
USPC .......................................................... 703/10
See application file for complete search history.

(56) References Cited

OTHER PUBLICATIONS

Raza, Syed Shabbar, et al. "A Stochastic Anisotropic Coal Permeability Model Using Mercury Intrusion Porosimetry, MIP and Stress-Strain Measurements." Asia Pacific Unconventional Resources Technology Conference, Brisbane, Australia, Nov. 18-19, 2019. Unconventional Resources Technology Conference. (Year: 2020).*

Duan, Yanting, Xiaodong Zheng, and Lianlian Hu. "Seismic facies analysis based on deep encoder clustering." SEG Technical Program Expanded Abstracts 2018. Society of Exploration Geophysicists, 2018. 2152-2156. (Year: 2018).*

Ismagilov et al., "Machine Learning Approach to Open Hole Interpretation and Static Modelling Applied to a Giant Field," SPE-191595-18RPTC-MS, Society of Petroleum Engineers (SPE), presented at the SPE Russian Petroleum Technology Conference, Moscow, Russia, Oct. 15-17, 2018, 18 pages.

Khan et al., "Machine learning derived correlations to determine water saturation in complex lithologies," SPE-192307-MS, Society of Petroleum Engineers (SPE), presented at the SPE Kingdom of Saudi Arabia Annual Technical Symposium and Exhibition, Dammam, Saudi Arabia, Apr. 23-26, 2018, 10 pages.

Onwuchekwa, "Application of machine learning ideas to reservoir fluid properties estimation," SPE-193461, Society of Petroleum Engineers (SPE), presented at the SPE Nigeria Annual International Conference and Exhibition, Aug. 6-8, 2018, 20 pages.

Vallabhaneni et al., "Machine Learning Based Petrophysical property modeling," SPE-195436-MS, Society of Petroleum Engineers (SPE), presented at the SPE Europec featured at the 81st EAGE Conference and Exhibition, London, England, Jun. 3-6, 2019, 7 pages.

Zhang et al., "Potential for Predication of Water Saturation Distribution in Reservoirs Utilizing Machine Learning Methods," Energies, MDPI, 2019, 12, 21 pages.

* cited by examiner

Ending log of permeability

Ending porosity

Starting log of permeability

Starting porosity

410

450

600

Access Measurement Data of a Reservoir 601

Detect Portions of the Measurement Data as Anomaly 602

Removing the Portions of the Measurement Data 603

Identifying Layers Along a Depth 604

Within Each Layer, Grouping the Measurement Data Into Non-Overlapping Clusters 605

Generating a 3D Permeability Model 606

Simulating a Performance of the Reservoir 607

SYSTEM AND METHOD FOR IMPLEMENTING MACHINE LEARNING FOR 3D GEO-MODELING OF PETROLEUM RESERVOIRS

TECHNICAL FIELD

This disclosure generally relates to reservoir characterization in the context of geo-exploration for oil and gas.

BACKGROUND

Accurate reservoir characterization can be instrumental in developing, monitoring, and managing reservoir production. Characterizing a reservoir by updating both static and dynamic reservoir properties during the life of the field is referred to as dynamic reservoir characterization. A large portion of oil and gas field development is based on three-dimensional (31)) numerical simulation results. These 3D numerical simulation results can leverage a f3D geo-model that uses core and log data obtained from wells as inputs to create a prototype of the reservoir.

SUMMARY

In one aspect, some implementations provide a computer-implemented method including: accessing measurement data that characterize one or more features at a range of depths inside a reservoir, wherein the measurement data are from more than one well locations at the reservoir; detecting portions of the measurement data that characterize the one or more features with a statistical metric that is below a pre-determined threshold; based on automatically removing the portions of the measurement data, identifying a plurality of layers along the range of depths of the reservoir; within each layer of the plurality of layers, grouping the measurements data among a plurality of clusters that are non-overlapping, wherein each cluster corresponds to a flow unit and is determined by a machine learning algorithm; generating a three-dimensional (3D) permeability model of the reservoir that include flow units of each layer from the plurality of layers; and simulating a performance of the reservoir based on the 3D permeability model.

Implementations may include one or more of the following features.

The one or more features may include: a permeability, a porosity, a water saturation, a rock-type, and a vertical heterogeneity. The statistical metric may include a probability density function based on (i) a mean of the one or more features and (ii) a covariance; matrix of the one or more features.

The computer-implemented method may further include: comparing the 3D permeability model with internal architectures derived from mercury injection capillary pressure (MICP) experiments on core samples extracted from the more than one well locations; and adjusting the plurality of layers and the plurality of clusters such that a difference between the 3D permeability model and the internal architectures is reduced.

The machine learning algorithm may determine the plurality of clusters, each having a centroid, and wherein a distance from the measurement data to the centroid of each cluster is substantially reduced. The machine learning algorithm may include: a K-means clustering algorithm.

The computer-implemented method may further include: determining a number for the plurality of clusters based on overlaying available data from a special core analysis (SCA)

on the measurements data. The SCA may generate at least one of: a relative permeability, or a capillary pressure. The computer-implemented method may further include: associating the measured data grouped among the plurality of clusters with the more than well locations such that the 3D permeability model covers the more than one well locations.

The computer-implemented method may further include: determining a water saturation height function for each cluster within each layer based on the machine learning algorithm; and incorporating the water saturation height function for each cluster into the 3D permeability model of the reservoir.

In another aspect, sonic implementations provide a computer system comprising one or more processors configured to perform operations of: accessing measurement data that characterize one or more features at a range of depths inside a reservoir, wherein the measurement data are from more than one well locations at the reservoir; detecting portions of the measurement data that characterize the one or more features with a statistical metric that is below a pre-determined threshold; based on automatically removing the portions of the measurement data, identifying a plurality of layers along the range of depths of the reservoir; within each layer of the plurality of layers, grouping the measurements data among a plurality of clusters that are non-overlapping, wherein each cluster corresponds to a flow unit and is determined by a machine learning algorithm; generating a three-dimensional (3D) permeability model of the reservoir that include flow units of each layer from the plurality of layers; and simulating a performance of the reservoir based on the 3D permeability model.

Implementations may include one or more of the following features.

The one or more features may include: a permeability, a porosity, a water saturation, a rock-type, and a vertical heterogeneity. The statistical metric may include a probability density function based on (i) a mean of the one or more features and (ii) a covariance matrix of the one or more features.

The operations may further include: comparing the 3D permeability model with internal architectures derived from mercury injection capillary pressure (MICP) experiments on core samples extracted from the more than one well locations; and adjusting the plurality of layers and the plurality of clusters such that a difference between the 3D permeability model and the internal architectures is reduced.

The machine learning algorithm may determine the plurality of clusters, each having a centroid, and wherein a distance from the measurement data to the centroid of each cluster is substantially reduced. The machine learning algorithm may include: a K-means clustering algorithm.

The operations may further include: determining a number for the plurality of clusters based on overlaying available data from a special core analysis (SCA) on the measurements data. The SCA may generate at least one of: a relative permeability, or a capillary pressure. The computer-implemented method may further include: associating the measured data grouped among the plurality of clusters with the more than well locations such that the 3D permeability model covers the more than one well locations.

The operations may further include: may further include: determining a water saturation height function for each cluster within each layer based on the machine learning algorithm; and incorporating the water saturation height function for each cluster into the 3D permeability model of the reservoir.

Implementations according to the present disclosure may be realized in computer implemented methods, hardware computing systems, and tangible computer-readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more implementations of the subject matter of this specification are set forth in the description, the claims, and the accompanying drawings. Other features, aspects, and advantages of the subject matter will become apparent from the description, the claims, and the accompanying drawings.

DESCRIPTION OF DRAWINGS

Like reference numbers and designations in the various drawings indicate like elements.

DETAILED DESCRIPTION

Figure 1:
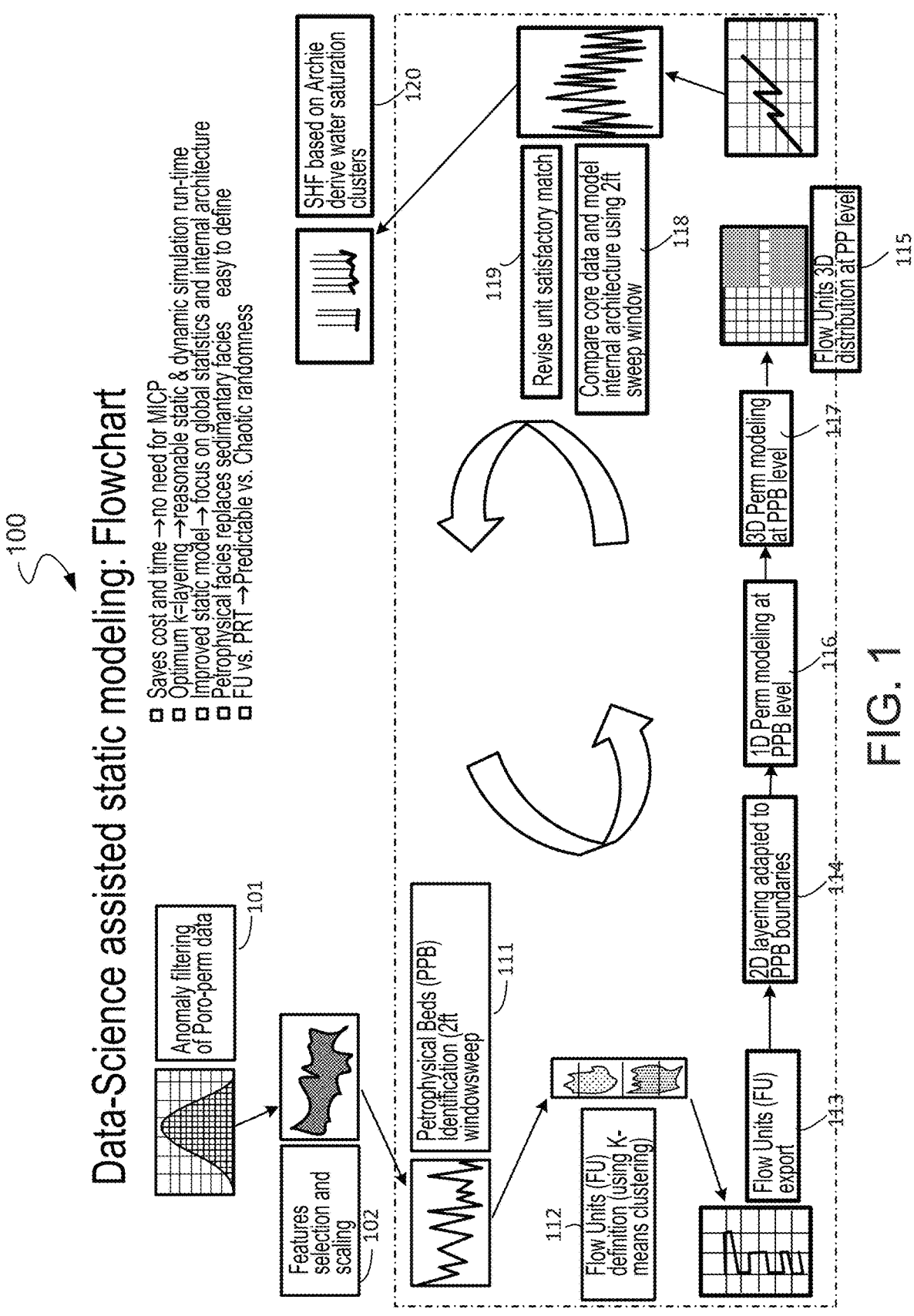
FIG. 1 shows an example of a flowchart for data-science assisted static modeling according to an implementation of the present disclosure.

Accurate reservoir characterization can be instrumental in developing, monitoring, and managing a reservoir and optimizing production. To achieve accuracy, reservoir characterization is often dynamic that starts with a simple model of the reservoir at a given time point (a static model). As new petrophysical, seismic, and production data become available, the reservoir model is updated to account for the changes in the reservoir. The updated model would be a better representative of the current status of the reservoir. Both static reservoir properties, such as porosity, permeability, and facies; and dynamic reservoir properties, such as pressure, fluid saturation, and temperature, needs to be updated as more field data become available.

The disclosed technology is directed to a computerized method for detecting and removing suspicious core and log data from input dataset when constructing a reservoir model. Some implementations pursue anomaly detection to exclude suspicious core and log data automatically so that lame data sets for reservoir modeling can be handled efficiently. These implementations can classify vertical layering using a window sweep mean algorithm, and can judiciously choose a specific number of layers that improves capturing the internal architecture of the reservoir. These implementations can significantly reduce the number of geo-model grids, thereby eventually reducing run-time of numerical simulation. Further, the implementations can incorporate machine learning derived saturation-height function modeling and machine learning derived flow units. Various implementations can determine porosity and permeability distribution, thereby facilitating a 3D geo-model whose internal architecture reflects observations from core and log data.

The terminology used in the present disclosure includes the following terms.

The term "PPB" refers to a reservoir layer having distinct characteristics from overlying and underlying layers. For the purpose of this disclosure, the PPB is used as the basis for defining the number of layers in the 3D geo-model to be constructed.

The term "flow unit" refers to rock classification based on its flow capacity/potential. Within each PPB, there could be the low, medium to very good permeability rocks mixed up in a heterogeneous fashion. Flow unit (FU) is a discrete classifier that identifies what is the flow potential/rock quality of a given volume of reservoir. For example in FIG. 4B, within each PPB, there are bands of permeability (in different colors) indicating defined Fus.

The term "machine learning analytics" refers to the use of machine learning and applied statistics to predict unknown conditions based on the available data. Two general areas that fall under machine learning analytics are classification and regression. While classification refers to the prediction of categorical values, regression connotes the prediction of continuous numerical values. One machine learning implementation is also known as "supervised learning" where the "correct" target or y values are available. For illustration, the goal of some implementations is to learn from the available data to predict the unknown values with some defined error metrics. In supervised learning, for example, there are a set of known predictors (features) $x_1$, $x_2$, . . . , $x_m$ which are known to the system as well as the target values $y_1$, $y_2$, . . . , $y_n$, which are to be inferred. The system's objective is to train a machine learning model to predict new target values $y_1$, $y_2$, . . . $y_n$ by observing new features.

The implementations can employ a variety of machine learning algorithms. For classification, examples of prediction algorithms can include logistic regression, decision trees, nearest neighbor, support vector machines, K-means clustering, boosting, and neural networks. For regression, examples of predication algorithms can include least squares regression, Lasso, and others. The performance of an algorithm can depend on a number of factors, such as the selected set of features, training/validation methods, and hyper parameters tuning. As such, machine learning analytics can manifest as an iterative approach of knowledge finding that includes trial and error. An iterative approach can iteratively modify data preprocessing and model parameters until the result achieves the desired properties.

Referring to FIG. 1, an example of a workflow diagram 100 is shown for data-science assisted static modeling of reservoir data. The workflow may start with porosity-permeability data, which may be included in log data from a number of environmental sensors and purging sensors. Environmental sensors may include temperature sensors and pressure sensors. Purging sensors may include flow speed and pressure sensors, and fluid type sensors. Implementations can apply machine learning algorithms to detect and filter anomalies from core and log data, detect hidden features within this data, which would help in constructing a reliable 3D geo-model that replicates the features detected within this data.

Figure 2A:
FIG. 2A is an example of a chart of porosity versus log permeability from core data according to an implementation of the present disclosure.

As illustrated, the porosity-permeability data may be filtered to remove anomaly (101). Referring to FIG. 2A, an example 200 is shown as a distribution of porosity (fraction) and logarithm of permeability. The porosity and permeability data plotted were obtained from core data measurement in a given reservoir. Portions of the porosity and permeability data are outliers, which would be filtered for subsequent processing. Some implementations can perform data-cleaning by using machine learning algorithms. For example, these machine learning algorithms may achieve automatic anomaly detection and filtering based on multivariate Gaussian distribution.

For dataset with features i=1, 2, . . . , n, if every $x_i \in \mathbb{R}^n$ has a Gaussian distribution with mean ($\mu$) and variance ($\sigma^2$), the probability density for each data-point p(x) can be expressed as a joint probability function as:

$$p(x) = \frac{1}{(2\pi)^{\frac{n}{2}} |\Sigma|^{\frac{1}{2}}} \exp\left(-0.5 * (x-\mu)^T \Sigma^{-1} (x-\mu)\right), \quad (1)$$

where $\Sigma$=Covance matrix of features ($\Sigma \in \mathbb{R}^{n \times n}$), $|\Sigma|$=determinant of covariance matrix and $\Sigma^{-1}$ is the inverse of covariance matrix.

Some implementations may initially determine the number of data features. Returning to FIG. 1, in these implementations, the number of data features may be selected and scaled (102). In one case, number of features n=2 is selected because each data-point is defined by a porosity value and a permeability value, the latter of which can be on a logarithmic scale, as shown in FIG. 2A.

In this case, the implementations may compute the mean of features and the covariance matrix of features according to equations 2 and 3 below.

$$\mu_i = \frac{1}{m} \sum_{j=1}^{m} x_i^j \quad (2)$$

$$\sum = \frac{1}{m} \sum_{j=1}^{m} (x-\mu)(x-\mu)^T \quad (3)$$

The implementations may then determine the set of data-points having probability density function such that $p(x) < \varepsilon$, where $\varepsilon$ is a small value and can be empirically determined. For example, implementations can choose the $\varepsilon$ iteratively using a feedback loop until filtered data-points achieve a satisfactory coverage of the ranges of the feature (e.g., a sufficient coverage in permeability range and porosity range).

Figure 2B:
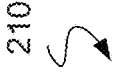
FIG. 2B is an example illustrating automatic identification of anomalous data in a chart of porosity versus log permeability according to an implementation of the present disclosure.

FIG. 2B shows an example 210 illustrating automatic identification of anomalous data in a chart of porosity versus log permeability according to an implementation of the present disclosure. In this example, the top panel shows the subset of the anomaly data points as outlier data points. The bottom two panels show the results from K-means clustering and logistic regression classifier. In both cases, the data points are filtered based on $\varepsilon < 0.05$. These cases demonstrate that observed data points with a likelihood of occurrence of 5% and less can be discarded. Notably, the data points flagged as anomalous by machine learning algorithms, such as those demonstrated above, are not necessarily erroneous. Instead, the data points may be correct data but are under-represented, as a population, in current database. If, however, in the future, additional data acquisition validates these currently excluded data points, then the probability density of these data points will no longer be small and these data points would not be flagged as anomalous.

Figure 3A:
FIG. 3A is an example of a plot showing log permeability as a function depth of core according to an implementation of the present disclosure.
Figure 3A:

Each core data point in FIGS. 2A-2B has a "depth" feature. Specifically, measurements of permeability and porosity values were taken on core plug samples obtained at various known subsurface depths. Instead of plotting porosity versus permeability, the feature can be presented as a motion of depth. Further referring to FIG. 3A, an example of a plot 300 of log-permeability (vertical axis in units of mD) as a function of depth (horizontal axis in feet) is demonstrated. Other features that could be plotted are log-permeability versus a horizontal location (e.g., lateral position with respect to an origin, known as Easting and/or Northing) of the well in which core-plug was taken. The purpose of the feature selection is to determine which features of data-sets provides improved discrimination between data clusters.

In reality, reservoirs are laid down over several thousands of years in batches of sediments which may be of varying quality and arriving from various sources. Reservoir characterization tends to be an incremental process in which the starting point can be a simple model of the reservoir at a given time point (a static model). As new petrophysical, seismic, and production data become available, the reservoir model is updated to account for the changes in the reservoir. The updated model would be a better representative of the current status of the reservoir. If a new set of arriving sediments have distinct characteristics from the previous episode of sediments, then a distinct PPB has been created. As illustrated in FIG. 1, implementations may then identify PPB layers (111). The goal of PPB identification is to derive insight about a reservoir's bedding characteristic (internal architecture) from available core data.

Figure 3B:
FIG. 3B illustrates an example of petrophysical bed (PPB) identification for the plot in FIG. 3A according to an implementation of the present disclosure.
Figure 3B:

Further referring to FIG. 3B, an example 310 is presented in which the arithmetic average permeability is calculated at every 2 ft as a sweeping window over the entire depth. The 2 ft window is an example only. Other lengths can be used. The resulting curve represents the average permeability within the window of 2 ft sweeping across the entire depth. Other window durations may also be used. As demonstrated in FIG. 3B, while some reservoir beds contain predominantly high permeability values, other beds contain almost equal proportions of the high permeability and low permeability, while still other beds contain predominantly low permeability beds.

Figure 3C:
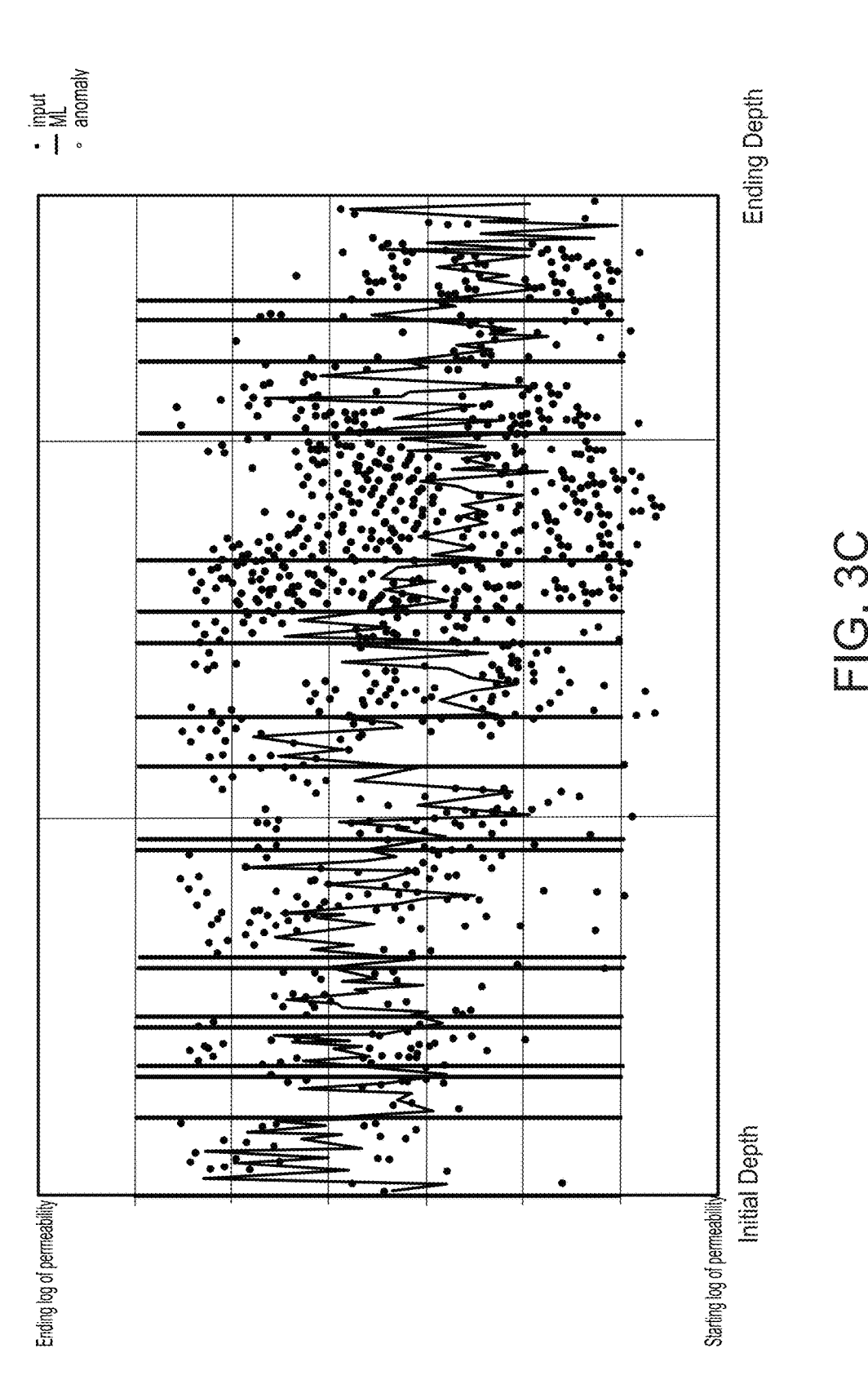
FIG. 3C illustrates an example of identifying boundaries for the plot in FIG. 3A according to an implementation of the present disclosure.

Machine learning algorithms, as described by the examples of the disclosure, can provide additional insight into a reservoir's internal architecture using only measurements taken from the core plug samples without engaging a laborious process of log-interpretation and inter-well correlation. The internal architectures can include permeability measurements based on invasive measurements such at mercury injection capillary pressure (MICP) experiments. Further referring to FIG. 3C, an example 320 shows that a machine learning algorithm classifies the data points from FIG. 3B (after filtering anomaly points) into 19 PPB layers.

Within each PPB, there could exist different bands/clusters of rock permeability, thereby giving rise to different flow characteristics. As illustrated in FIG. 1, flow units (FUs) may then be defined using, for example, K-means clustering (112). Flow unit (FU) identification can be performed next to determine rock permeability clusters having similar properties. Some implementations may incorporate a K-means clustering algorithm to determine the natural clusters of rock permeability within each PPB layer.

In more detail, a K-means clustering algorithm can locate natural clusters within a dataset by determining the optimum location of centroids that permits, for example, a minimization of the sum of distances between each centroid and the data points allocated to the centroid. In some implementations, the machine learning algorithm can allocate, based on a user input of the number of required clusters, each data point to a cluster c such that the cost function, as detailed in eq. 4, is minimized in a mathematical sense.

$$c^1 = \min \|x^m - \mu^l\|^2 \qquad (4)$$

where c is each cluster, x is each data point, $\mu$ is each centroid.

Figure 4A:
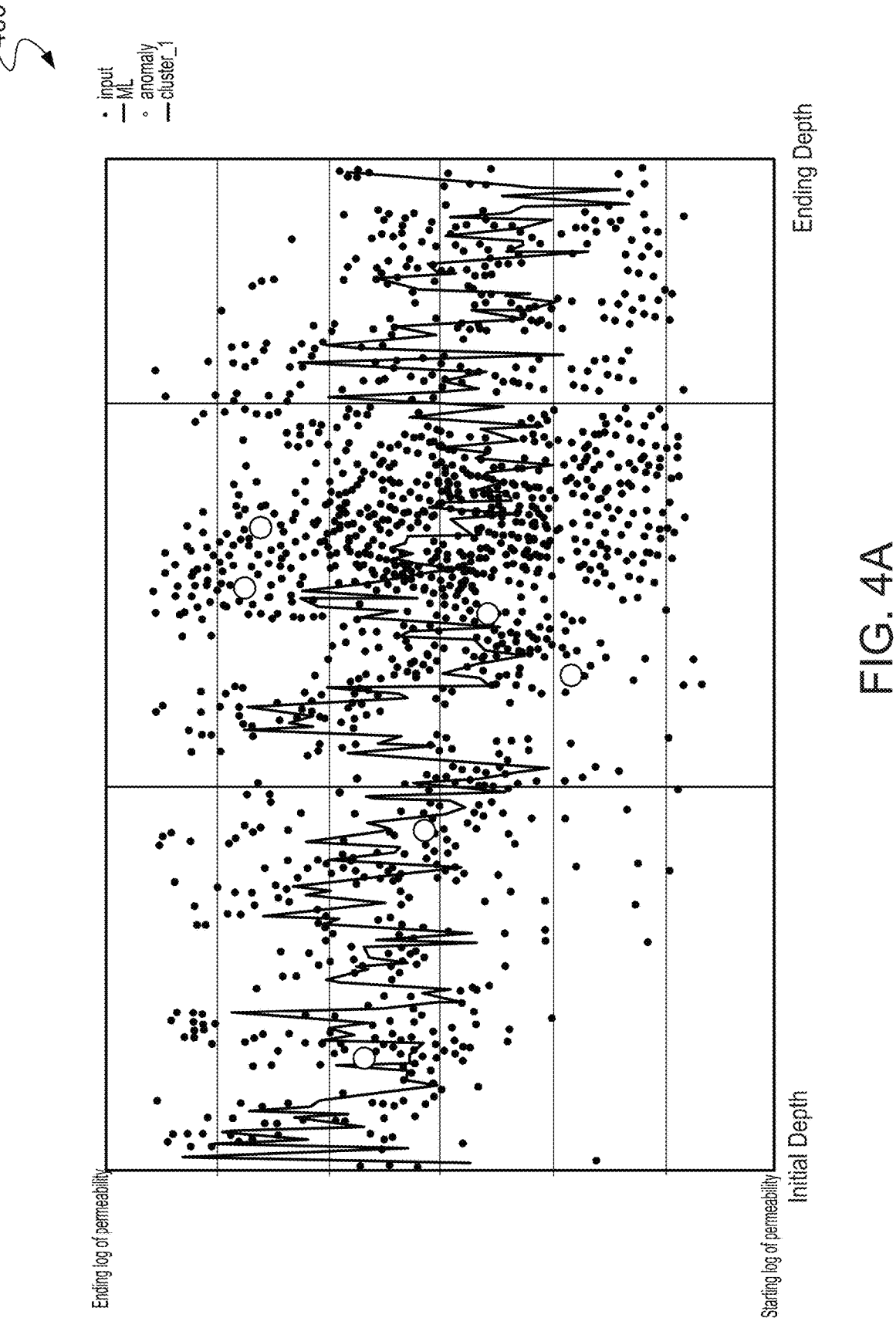
FIG. 4A illustrates an example of overlaying special core analysis data on the log permeability plot of FIG. 3A according to an implementation of the present disclosure.

Some implementations can determine the number of required clusters by overlaying the available special core analysis log (SCAL) data on the log permeability data as a function of depth (shown in FIG. 4A). For context, special core analysis is a type of analysis that measures reservoir flow properties such as relative permeability and capillary pressure from core plugs, in addition to porosity and permeability measurement. In comparison, routine core analysis (RCA) measures only porosity and permeability. Further referring to FIG. 4A, an example 400 shows that the various locations of SCAL data are overlaid on a plot of the log of permeability as a function depth. The dots indicate the depth locations where the core plugs for the SCAL analysis were taken and the corresponding readout of permeability.

Determining several FUs in a reservoir can be pointless in the absence of measured SCAL data to allocate to these units. As illustrated in FIG. 4A, some implementations can define four (4) permeability bands covered by the SCAL data. The four (4) permeability bands are as follows:

Low permeability band ➔ log-permeability<2
Medium permeability band ➔ 2<log-permeability<4
Good permeability band ➔ 4<log-permeability<6
Very good permeability band ➔ log-permeability>6

Figure 4B:
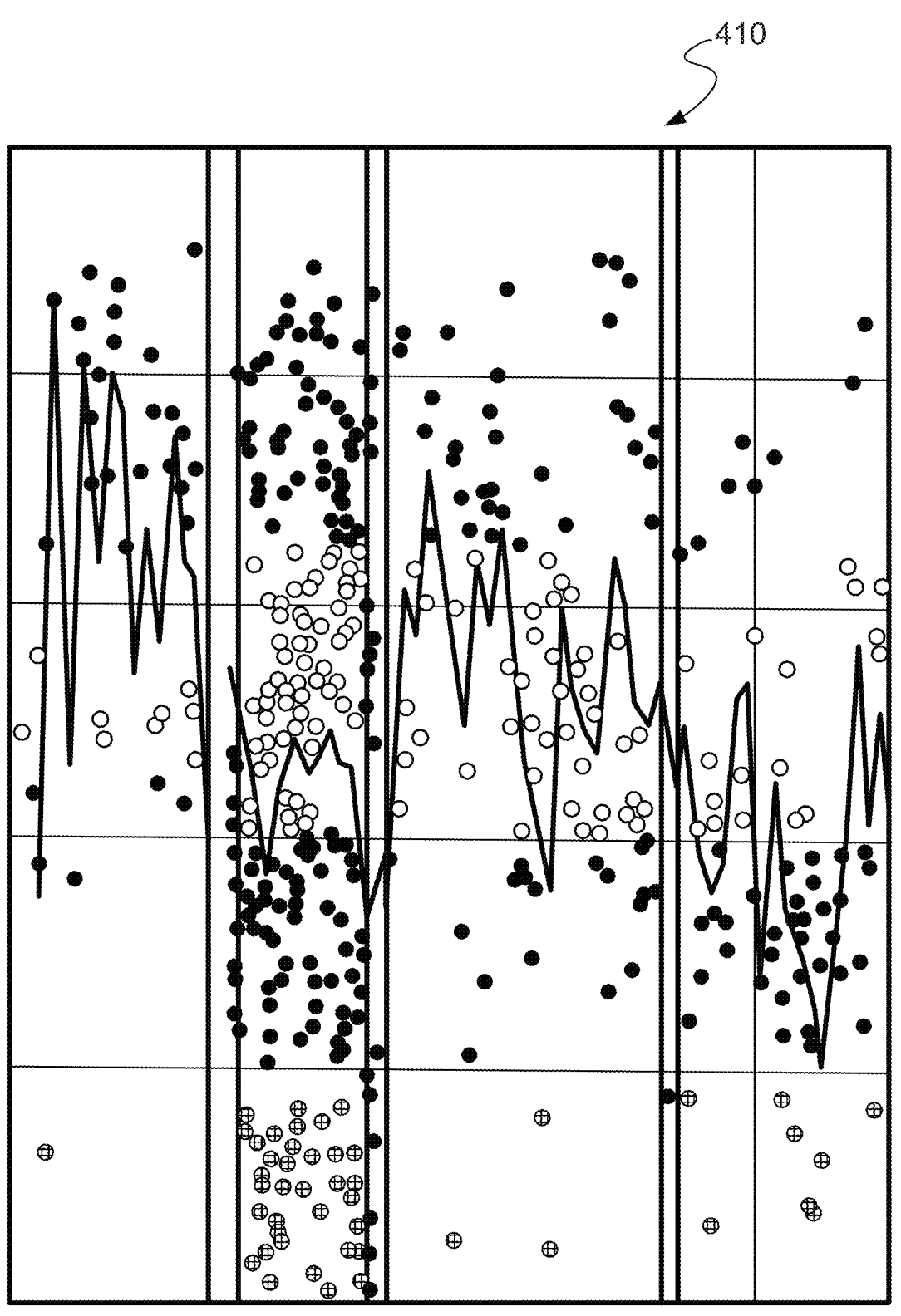
FIG. 4B illustrates an example of cluster identification in the example of FIG. 4A according to an implementation of the present disclosure.
Figure 4C:
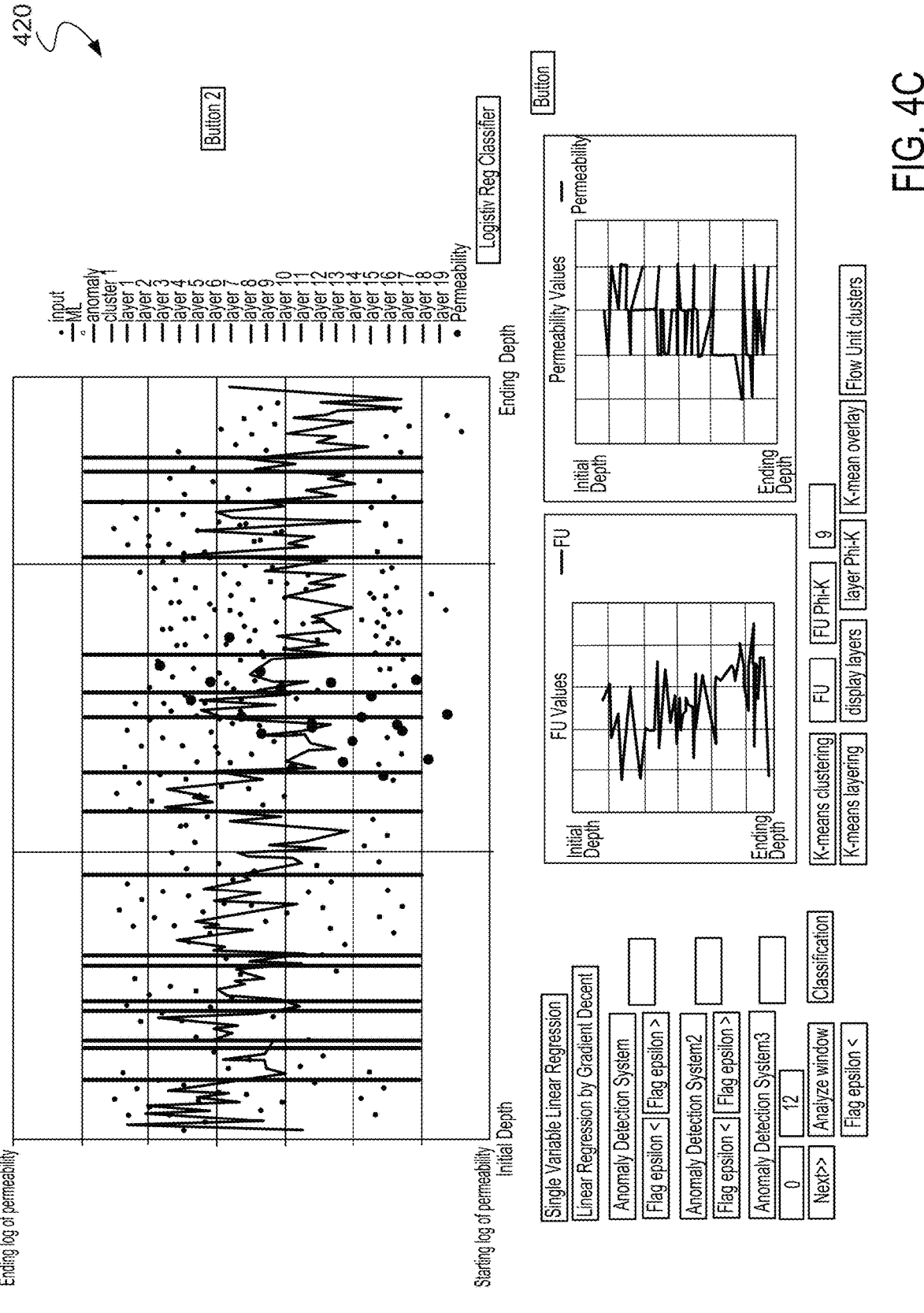
FIG. 4C shows an example of generating flow units (FUs) per well based on the cluster identification of FIG. 4B.

Using an input cluster number of 4, the k-means algorithm goes into each PPB and generates clusters as shown in example 410 of FIG. 4B. As noted, each data point in FIG. 4B is derived from a measurement on a core-plug which comes from a known well. Hence to define FU at a well level, an algorithm can traverse the available data points and select the data points that came from the desired well. This determination also indicates the FU to which each of the data points of this well belongs. This determination corresponds to step of the well level FU export (113) of FIG. 1. In an example 420 shown in FIG. 4C, the thick dots in the upper panel show the data points belonging to a selected well (e.g., well #6), while the line in the lower-left panel shows the permeability as a function of depth, and the line in the lower-right panel indicates the FU number associated with each datapoint at various depths.

Figure 4D:
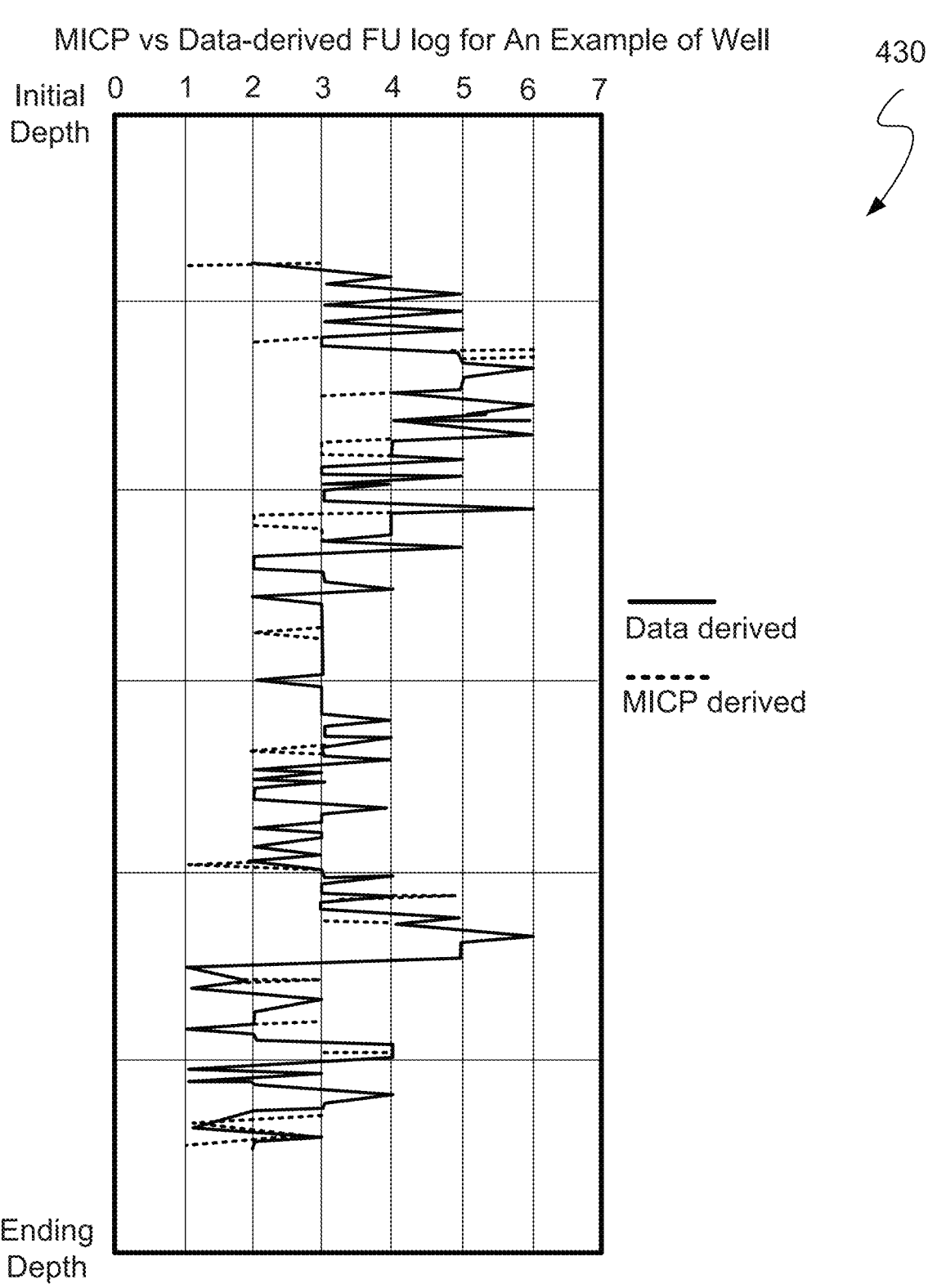
FIG. 4D shows an example illustrating a comparison of the FU results generated according to an implementation of the present disclosure and those generated based on a conventional MICP approach.

As illustrated in FIG. 1, some implementations may then adapt 3D layering to the PPB boundaries (114). For example, the PPB boundaries that have been identified and shown in FIG. 3C can be used as the layers of a 3D geo-model of the reservoir. The PPB boundaries can be further refined to capture more details as desired. Further referring to graph 430 in FIG. 4D, the FU export for a given well based on the proposed data-driven approach yields results very similar to those from conventional MICP approach. Indeed, the similarity is about 85%.

Figure 4E:
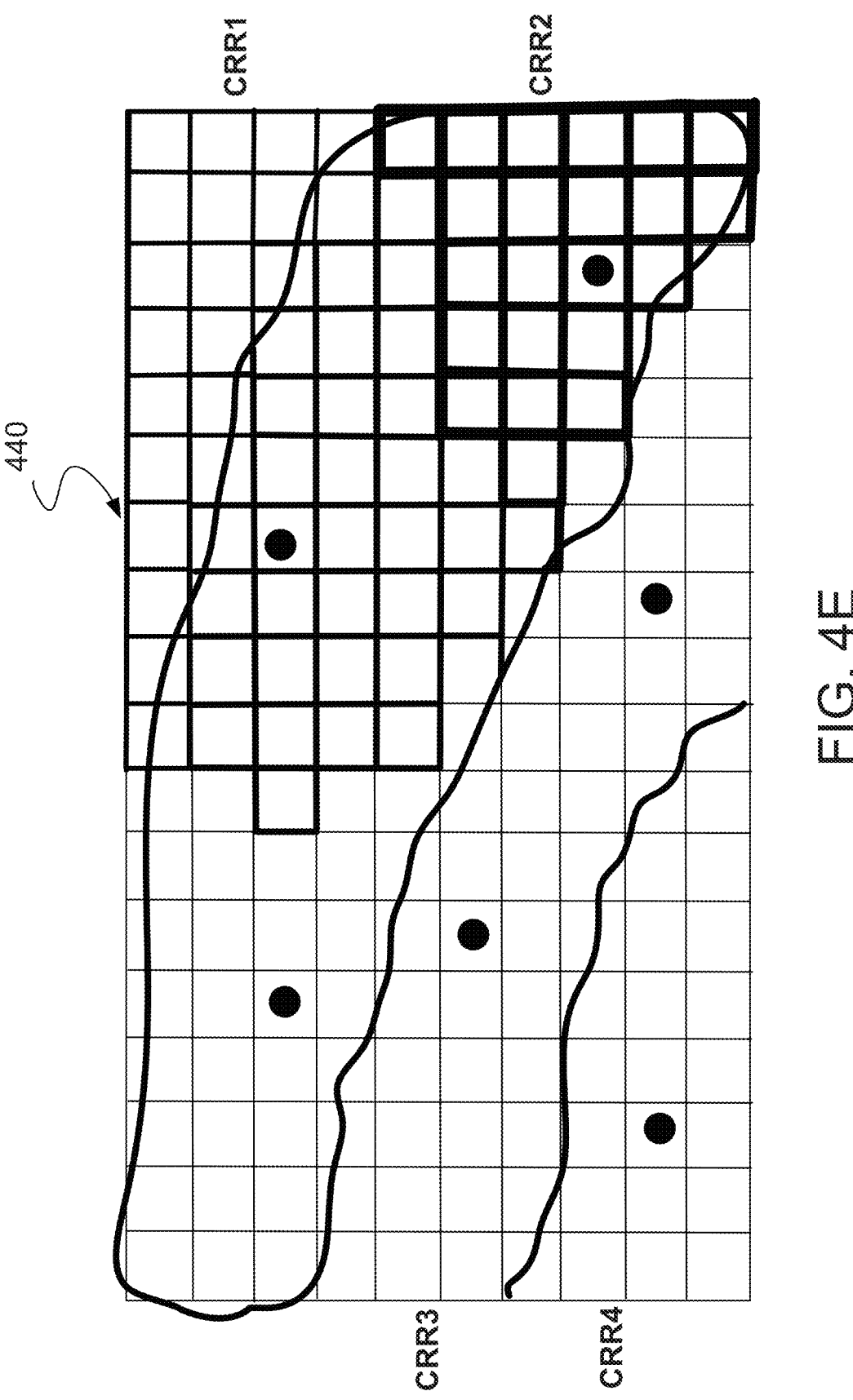
FIG. 4E shows an example of the 3D distribution of FU in connected reservoir regions (CRRs) according to an implementation of the present disclosure.

As illustrated in FIG. 1, implementations may then perform 1D permeability modeling using multi-variate linear regression (MVLR) algorithms (116). Thereafter, the implementations may then perform 3D permeability modeling at each PPB level (117). An approach for 3D definition of porosity and permeability includes data allocation of both porosity and permeability to grid-blocks based on the property of the closest core data as illustrated below.

a. Each grid containing a well is allocated the core data porosity and permeability of the PPB covered by the grid.

b. Every other non-well grid-block is allocated the same porosity and permeability as the closest well-grid, as further illustrated below and in FIG. 4E.

c. Because a given permeability value defines a FU (as illustrated in FIG. 4B), the FU is also allocated to each non-well grid based on the FU corresponding to the allocated permeability.

d. An earlier filed patent application, namely, U.S. application Ser. No. 16/280,581 (published US20190257196A1 and incorporated by reference in its entirely), has described a use case in which the reservoir has different connected reservoir regions (CRR). In this use case example, if timed apse pressures (e.g., based on a pressure transient analysis (PTA)) from wells in a reservoir show that the pressures could be clustered into different groups, then the spatial delineation of wells within the same pressure group is called a CRR. A reservoir exhibits different CRR because of large scale differences in rock property (porosity and permeability).

e. In such a use case, porosity and permeability obtained from a given well are only allocated within the CRR containing that well. Within each CRR containing more than 1-cored well, each non-well grid is allocated the porosity and permeability of the nearest well-grid.

f. If there is no cored well within a given CRR, various implementations may assume a uniform property to be allocated to the entire CRR. For example, some implementations can derive the permeability value from PTA interpretation of a well producing within the CRR and use an analogue porosity-permeability relationship to derive the corresponding porosity, while determining the FU based on the PTA-derived permeability (FIG. 4B).

g. FIG. 4E illustrates the property allocation in 3D in which the implementations can allocate, within each CRR, properties (porosity, permeability and FU) to non-well grids based on the closest well-grid data. In these implementations, the data from a CRR may not extend to a different CRR. For example, when CRR1 has no cored well, then the PTA-derived permeability may be used. In these implementations, porosity can be derived from the average reservoir's poro-perm relationship. The FU can be determined from FIG. 4B based on the PTA-derived permeability.

As illustrated in FIG. 1, some implementations may then generate flow units (FUs) 3D distribution at each PPB layer (115). In an example 440, FIG. 4E shows, for a PPB layer, the FU levels in colored blocks that are distributed in a continuous fashion away from the well control points (shown in various dots). Each dot represents the location of the core data taken at a given PPB layer. Because the core data is from a physical well, each dot corresponds to a location of a physical well where the core data was taken.

As illustrated in FIG. 1, after completing 3D permeability modeling, some implementations may compare the internal architecture derived from the measurements data from the core sample plugs to that derived by 3D model using 2 ft window-sweep (e.g., FIG. 3B) (118). The implementations may then revise the steps described until satisfactory match is obtained (119). In particular, in case of mismatch, the PPB boundaries may be refined to capture finer details, and the number of FU clusters can be increased.

Figure 5A:
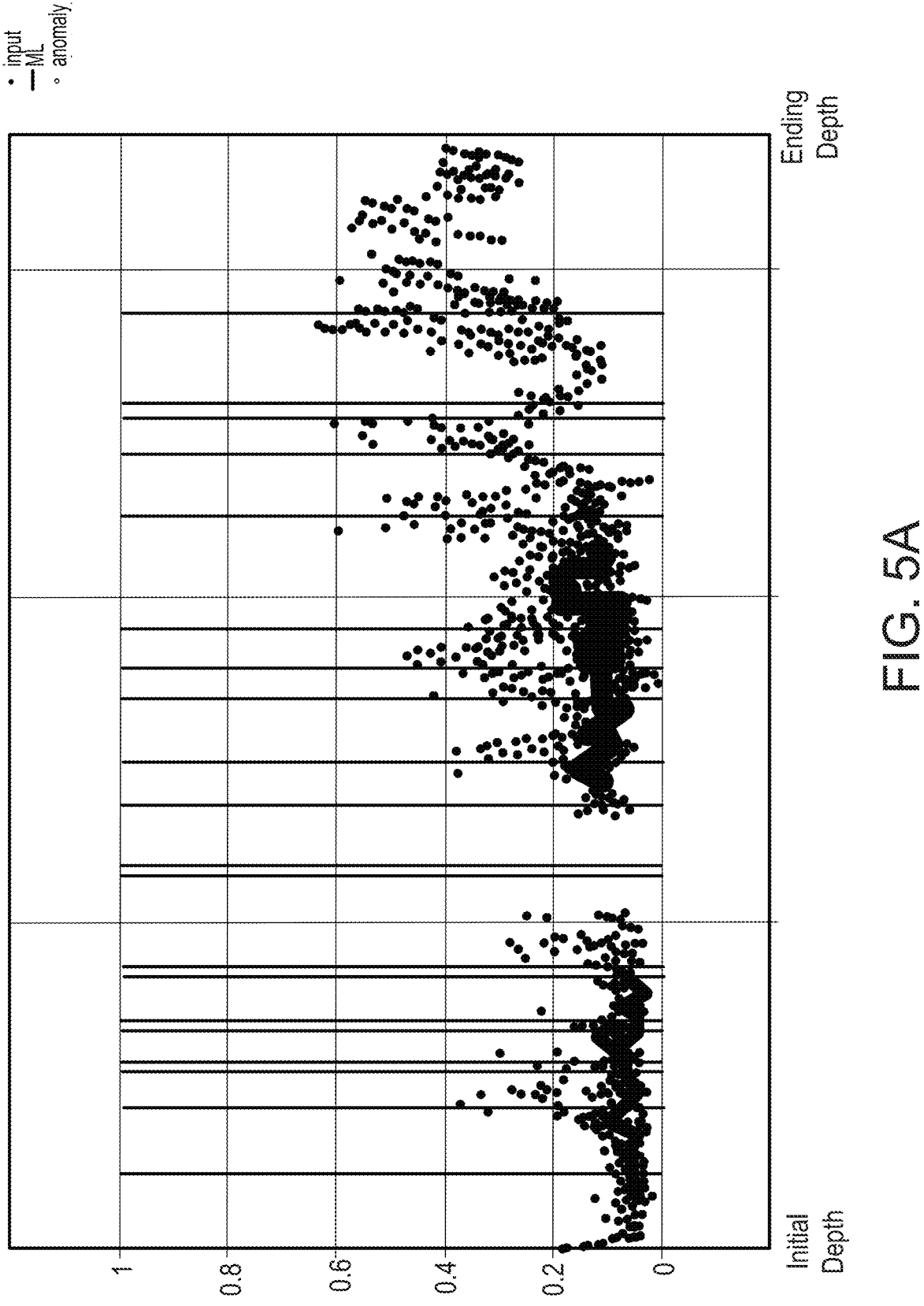
FIG. 5A shows an example of data cloud of Archie derived water saturation interpreted from well logs according to an implementation of the present disclosure.

As illustrated in FIG. 1, some implementations may then pursue saturation-height function modeling based on Archie derived water saturation clusters (120). Referring to FIG. 5A, the Archie derived water saturation log for all wells may be plotted and overlaid with the PPB boundaries. Here, the Archie's water saturation is given by the following equation:

$$S_w = \sqrt{\frac{aR_w}{\varphi^m R_t}} \qquad (5)$$

In this equation $\varphi$=porosity; Rw=formation resistivity factor (the resistivity of a formation containing only formation 'saline' water), Rt=true formation resistivity (the resistivity of a formation containing both oil and water), m=cementation factor, a=tortuosity factor and is usually=0.82.

Figure 5B:
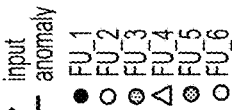
FIG. 5B shows an example of water saturation clustering per FU based on the example in FIG. 5A according to an implementation of the present disclosure.

Some implementations may incorporate machine learning algorithms such as K-means clustering to define natural clusters per PPB layer. The number of clusters may correspond to the number of FUs that have been earlier defined. An example of saturation log clustering is shown in FIG. 5B. Here, the vertical axis is depth while the horizontal axis shows the water saturation level.

For illustration, an arbitrary cluster size of 6 can be used. Some implementations may use the defined number of FUs as cluster size. In these implementations, the clustering algorithm can associate every log water-saturation data with a permeability value at that depth. In case of no cored permeability value at the corresponding depth, the clustering algorithm can associate the nearest cored permeability value to each water saturation depth within 0.5 ft. If there is no cored permeability data associated with a given water saturation data, then that water saturation point is discarded. The implementations may then, for all water saturation values at every depth that are associated with cored permeability value at same depth (or nearest depth with 0.5 ft), check the FU corresponding to the associated permeability, and allocate this water saturation value to that FU.

Figure 4F:
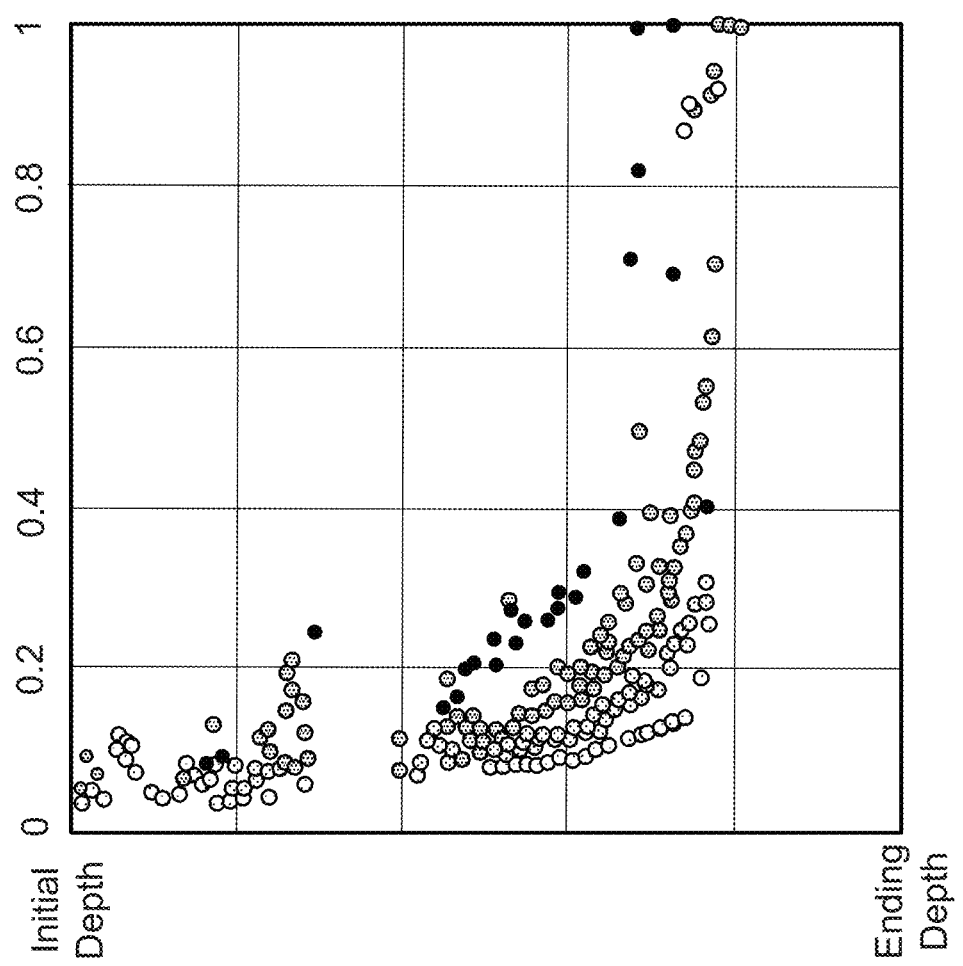
FIG. 4F shows an example of a resulting saturation height function (SHF) for each FU according to an implementation of the present disclosure.
Figure 4G:
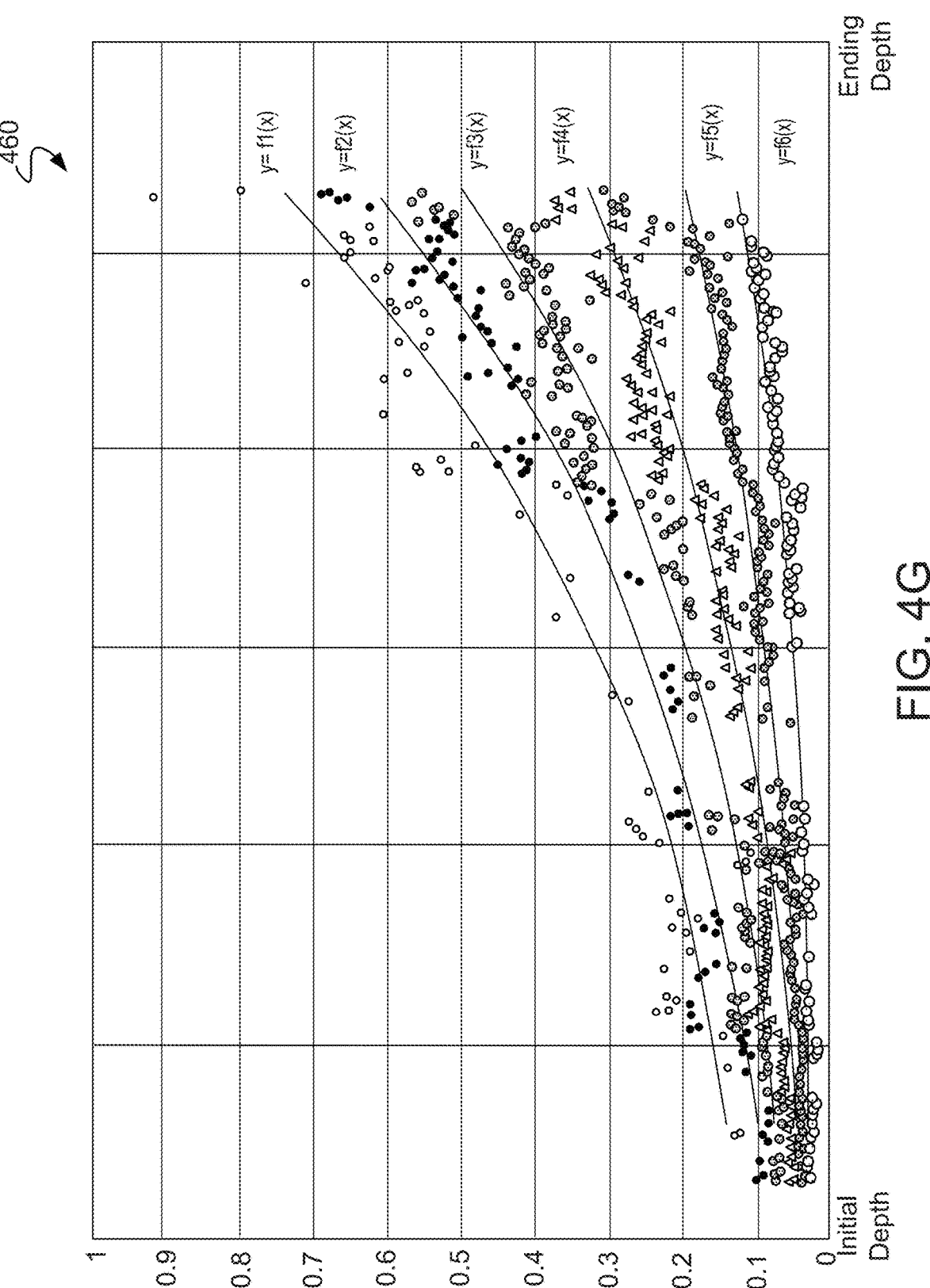
FIG. 4G shows an example of the distribution of the FUs in each PPB layer of a 3D model according to an implementation of the present disclosure.

FIG. 4F shows the resulting saturation height function (SHF) for each FU in this illustrated example 450. Here, the vertical axis is the depth and the horizontal axis is the allocated water saturation level. Further referring to FIG. 4G, power law equations are then generated to represent the data points in each FU. As illustrated in example 460, the FUs have been distributed into each of the six PPB layers of the 3D model. Thereafter, for each grid-block of the 3D geo-model, a water saturation is calculated as a function of the depth of the grid and the FU of the grid.

While some geo-modeling efforts focus on building geo-models in which the global statistics of core data are honored, these models may not honor internal reservoir architecture (e.g., bedding characteristics). Data from mercury injection capillary pressure (MICP) experiments can be costly to obtain and time-consuming to analyze (for determining FU and SHF). Additionally, these models may not incorporate automatic detection and removal of data anomaly. When these anomalies are not removed, the anomalies are carried into the geo-model. When removed, the process is manual, laborious, and could be biased by subjective judgement that varies from individual to individual.

Implementations described by the present disclosure may allow building 3D geo-models that honor global statistics as well as local peculiarities (internal architecture) within the reservoir using insights derived from measurements of core sample plugs. The implementations can further eliminate the cost (time and money) associated with mercury injection capillary pressure experiments (MICR) which can be used as the basis for rock-typing (FU) and saturation height function modeling. The implementations provide an automated technique for data anomaly detection and removal thereby saving time for data processing and analyzing. The implementations can further provide a technique for finding salient trends in porosity-permeability data clouds. For example, by plotting permeability versus depth instead of the conventional practice of plotting permeability versus porosity, an improved characterization of each PPB layer can be obtained. Indeed, the implementations are capable of calculating permeability as a function of porosity within each FU level of every PPB layer, thereby preserving local peculiarities (e.g., internal architecture) of the reservoir in the geological model.

To the extent that an accurate understanding of a reservoir's internal architecture may require a correlation of data from wells, such correlation could take several weeks for a project involving a few hundred wells. Implementations of the present disclosure using, for example, the machine learning approach of the 2 ft window-sweep (FIG. 3B), may derive the information from core data within minutes.

Figure 6:
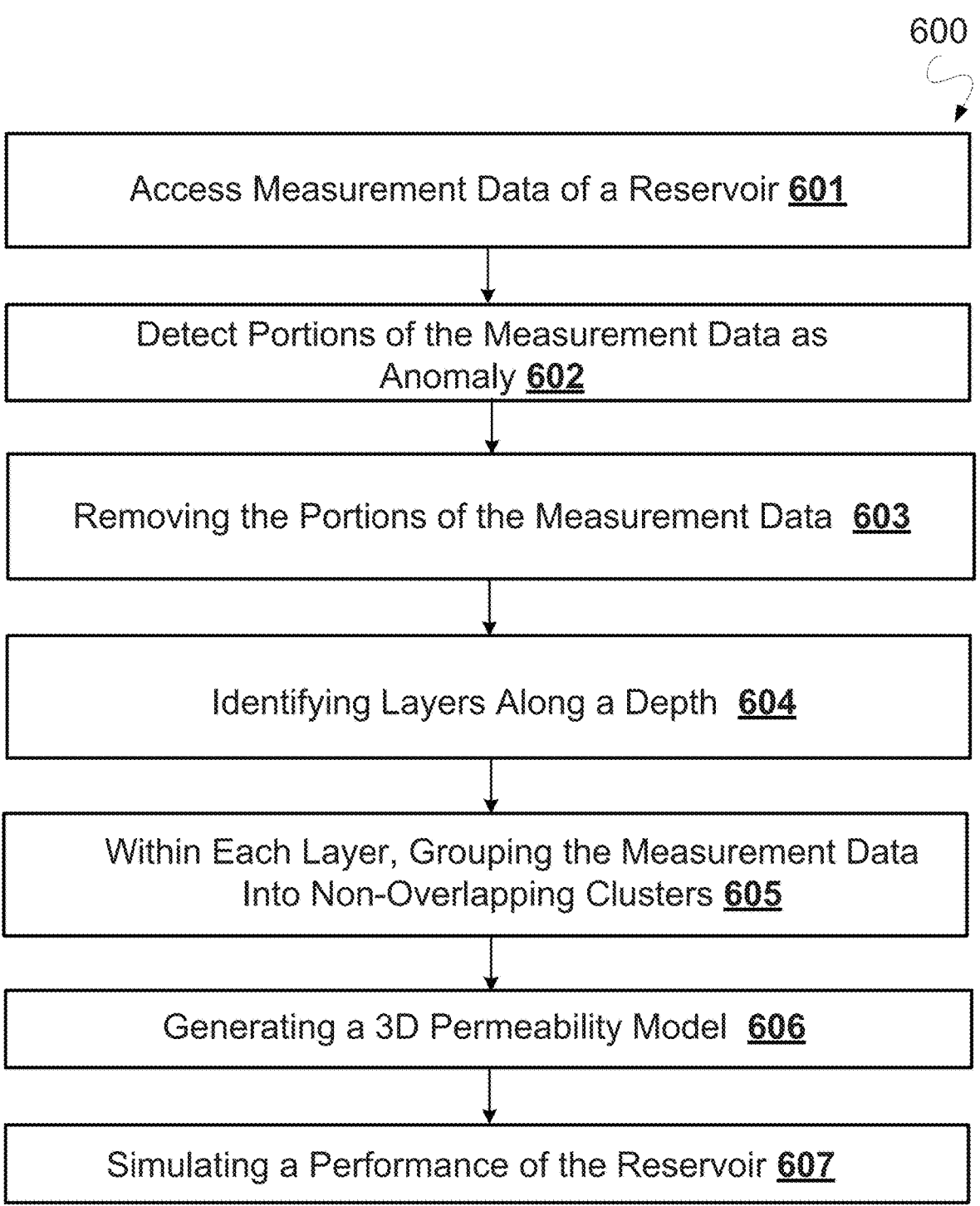
FIG. 6 is an example of a flowchart according to an implementation of the present disclosure.

As illustrated by the flowchart 600 of FIG. 6, an implementation may start with obtaining access to measurement data of a reservoir (601). The measurement data may characterize one or more features of a reservoir, for example, a permeability, a porosity, a water saturation, a rock-type, and a vertical heterogeneity. The measurement data may be taken from multiple well locations of the reservoir and from a range of depths inside the reservoir. The well locations may refer to the actual location where the bore was drilled and core plug samples were taken. The measurement data does not include data from mercury injection capillary pressure (MICR) experiments, which tend to be costly and time-consuming. Instead, the measurement data can be taken onsite.

Next, the implementations may detect portions of the measurement data that are statistical outliers (602). In some cases, a probability density function is computed based on (i) a mean of the one or more features and (ii) a covariance matrix of the one or more features. The portions of measurement data with probability density functions that fall within a pre-determined threshold level are detected as anomaly, or under represented. The implementations may automatically remove the detected portions from subsequent processing (603).

Thereafter, the implementations may identify a plurality of layers along the range of depths of the reservoir (604). These layers may also be known as petrophysical bed (PPB) layers. In the context of characterizing a reservoir as a result of evolution, the PPB is defined as a reservoir layer having distinct characteristics from overlying and underlying layers. PPB can be used as the basis for defining the number of layers in the 3D neo-model to be constructed.

Subsequently, the implementations may group the measurement data among a plurality of clusters that are non-overlapping within each PPB layer (505). In some cases, each cluster corresponds to a flow unit and is determined by a machine learning algorithm. For example, a K-means clustering algorithm may be used. The K-means clustering algorithm may be either supervised or unsupervised.

Implementations may then generate a three-dimensional (3D) permeability model of the reservoir based on the flow unit of each layer (606). After completing 3D permeability modeling, the implementations may compare the internal architecture derived from core data to that derived by the 3D model. The core data may refer to data from invasive experiments, such as mercury injection capillary pressure (MICP) experiments. Based on the comparison, the implementations may revise, for example, the PPB layers, or the clusters for each PPB layer until satisfactory match is obtained. In particular, in case of a mismatch, the PPB boundaries may be refined to capture finer details and the number of clusters for each layer may be increased.

The implementations may then pursue a simulation of the reservoir based on the 3D permeability model. For example, a performance of the reservoir may be simulated (607). In other words, the 3D permeability model from various implementations can serve as input into a reservoir simulator to drive a simulation. Indeed, the 3D permeability model can be found as consistent with (or calibrated by) results of using science/theory based approaches, which tend to be costly and time-consuming. The advantages of the implementations include: in the absence of data (or enough data) to carry out theory-based 3D model building, data-derived approaches may fill the gap and without loss of accuracy.

Figure 7:
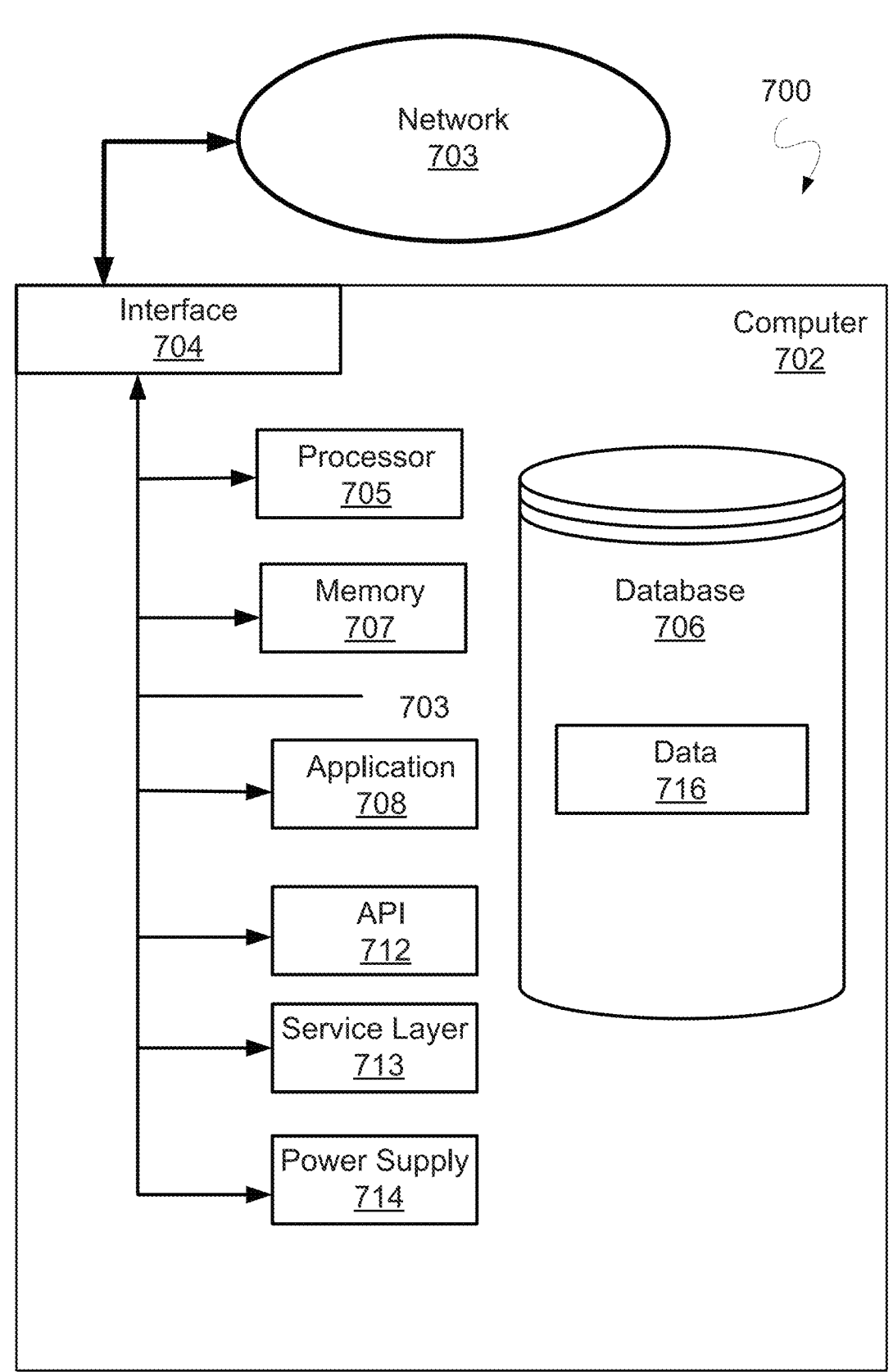
FIG. 7 is a block diagram illustrating an example of a computer system used to provide computational functionalities associated with described algorithms, methods, functions, processes, flows, and procedures, according to an implementation of the present disclosure.

FIG. 7 is a block diagram illustrating an example of a computer system 700 used to provide computational functionalities associated with described algorithms, methods, functions, processes, flows, and procedures, according to an implementation of the present disclosure. The illustrated computer 702 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 702 can comprise a computer that includes an input device, such as a keypad, keyboard, touch screen, another input device, or a combination of input devices that can accept user information, and an output device that conveys information associated with the operation of the computer 702, including digital data, visual, audio, another type of information, or a combination of types of information, on a graphical-type user interface (UI) (or GUI) or other UI.

The computer 702 can serve in a role in a computer system as a client, network component, a server, a database or another persistency, another role, or a combination of roles for performing the subject matter described in the present disclosure. The illustrated computer 702 is communicably coupled with a network 703. In some implementations, one or more components of the computer 702 can be configured to operate within an environment, including cloud-computing-based, local, global, another environment, or a combination of environments.

The computer 702 is an electronic computing device operable to receive, transmit, process, store, or manage data and information associated with the described subject matter. According to some implementations, the computer 702 can also include or be communicably coupled with a server, including an application server, e-mail server, web server, caching server, streaming data server, another server, or a combination of servers.

The computer 702 can receive requests over network 703 (for example, from a client software application executing on another computer 702) and respond to the received requests by processing the received requests using a software application or a combination of software applications. In addition, requests can also be sent to the computer 702 from internal users, external or third-parties, or other entities, individuals, systems, or computers.

Each of the components of the computer 702 can communicate using a system bus/network 703. In some implementations, any or all of the components of the computer 702, including hardware, software, or a combination of hardware and software, can interface over the system bus/network 703 using an application programming interface (API) 712, a service layer 713, or a combination of the API 712 and service layer 713. The API 712 can include specifications for routines, data structures, and object classes. The API 712 can be either computer-language independent or dependent and refer to a complete interface, a single function, or even a set of APIs. The service layer 713 provides software services to the computer 702 or other components (whether illustrated or not) that are communicably coupled to the computer 702. The functionality of the computer 702 can be accessible for all service consumers using this service layer. Software services, such as those provided by the service layer 713, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 702, alternative implementations can illustrate the API 712 or the service layer 713 as stand-alone components in relation to other components of the computer 702 or other components (whether illustrated or not) that are communicably coupled to the computer 702. Moreover, any or all parts of the API 712 or the service layer 713 can be implemented as a child or a sub-module of another software module, enterprise application, or hardware module without departing from the scope of the present disclosure.

The computer 702 includes an interface 704. Although illustrated as a single interface 704 in FIG. 7, two or more interfaces 704 can be used according to particular needs, desires, or particular implementations of the computer 702. The interface 704 is used by the computer 702 for communicating with another computing system (whether illustrated or not) that is communicatively linked to the network 703 in a distributed environment. Generally, the interface 704 is operable to communicate with the network 703 and comprises logic encoded in software, hardware, or a combination of software and hardware. More specifically, the interface 704 can comprise software supporting one or more communication protocols associated with communications such that the network 703 or interface's hardware is operable to communicate physical signals within and outside of the illustrated computer 702.

The computer 702 includes a processor 705. Although illustrated as a single processor 705 in FIG. 7, two or more processors can be used according to particular needs, desires, or particular implementations of the computer 702. Generally, the processor 705 executes instructions and manipulates data to perform the operations of the computer 702 and any algorithms, methods, functions, processes, flows, and procedures as described in the present disclosure.

The computer 702 also includes a database 706 that can hold data for the computer 702, another component communicatively linked to the network 703 (whether illustrated or not), or a combination of the computer 702 and another component. For example, database 706 can be an in-memory, conventional, or another type of database storing data consistent with the present disclosure. In some implementations, database 706 can be a combination of two or more different database types (for example, a hybrid in-memory and conventional database) according to particular needs, desires, or particular implementations of the computer 702 and the described functionality. Although illustrated as a single database 706 in FIG. 7, two or more databases of similar or differing types can be used according to particular needs, desires, or particular implementations of the computer 702 and the described functionality. While database 706 is illustrated as an integral component of the computer 702, in alternative implementations, database 706 can be external to the computer 702. As illustrated, the database 706 holds the previously described data 716 including, for example, multiple streams of data from various sources, such as measurement data in the form of permeability and porosity, as shown in FIGS. 2A to 3C.

The computer 702 also includes a memory 707 that can hold data for the computer 702, another component or components communicatively linked to the network 703 (whether illustrated or not), or a combination of the computer 702 and another component. Memory 707 can store any data consistent with the present disclosure. In some implementations, memory 707 can be a combination of two or more different types of memory (for example, a combination of semiconductor and magnetic storage) according to particular needs, desires, or particular implementations of the computer 702 and the described functionality. Although illustrated as a single memory 707 in FIG. 7, two or more memories 707 or similar or differing types can be used according to particular needs, desires, or particular implementations of the computer 702 and the described functionality. While memory 707 is illustrated as an integral component of the computer 702, in alternative implementations, memory 707 can be external to the computer 702.

The application 708 is an algorithmic software engine providing functionality according to particular needs, desires, or particular implementations of the computer 702, particularly with respect to functionality described in the present disclosure. For example, application 708 can serve as one or more components, modules, or applications. Further, although illustrated as a single application 708, the application 708 can be implemented as multiple applications 708 on the computer 702. In addition, although illustrated as integral to the computer 702, in alternative implementations, the application 708 can be external to the computer 702.

The computer 702 can also include a power supply 714. The power supply 714 can include a rechargeable or non-rechargeable battery that can be configured to be either user- or non-user-replaceable. In some implementations, the power supply 714 can include power-conversion or management circuits (including recharging, standby, or another power management functionality). In some implementations, the power-supply 714 can include a power plug to allow the computer 702 to be plugged into a wall socket or another power source to, for example, power the computer 702 or recharge a rechargeable battery.

There can be any number of computers 702 associated with, or external to, a computer system containing computer 702, each computer 702 communicating over network 703. Further, the term "client," "user," or other appropriate terminology can be used interchangeably, as appropriate, without departing from the scope of the present disclosure. Moreover, the present disclosure contemplates that many users can use one computer 702, or that one user can use multiple computers 702.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded inion an artificially generated propagated signal, for example, a machine-generated electrical, optical, or electromagnetic signal that is generated to encode information for transmission to a receiver apparatus for execution by a data processing apparatus. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second (s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with an operating system of some type, for example LIMA, UNIX, WINDOWS, MAC OS, ANDROID, IOS, another operating system, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and apparatus can also be implemented as, special purpose logic circuitry, for example, a CPU, an FPGA, or an ASIC.

Computers for the execution of a computer program can be based on general or special purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device.

Non-transitory computer-readable media for storing computer program instructions and data can include all forms of media and memory devices, magnetic devices, magneto optical disks, and optical memory device. Memory devices include semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Magnetic devices include, for example, tape, cartridges, cassettes, internal/removable disks. Optical memory devices include, for example, digital video disc (DVD), CD-ROM, DVD+/-R, DVD-RAM, DVD-ROM, HD-DVD, and BLURAY, and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity, a multi-touch screen using capacitive or electric sensing, or another type of touchscreen. Other types of devices can be used to interact with the user. For example, feedback provided to the user can be any form of sensory feedback. Input from the user can be received in any form, including acoustic, speech, or tactile input. In addition, a computer can interact with the user by sending documents to and receiving documents from a client computing device that is used by the user.

The term "graphical user interface," or "GUI," can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (AVIAN) using, for example, 802.11 a/b/g/n or 802.20 (or a combination of 802.11x and 802.20 or other protocols consistent with the present disclosure), all or a portion of the Internet, another communication network, or a combination of communication networks. The communication network can communicate with, for example, Internet Protocol (IP) packets, Frame Relay frames, Asynchronous Transfer Mode (ATM) cells, voice, video, data, or other information between networks addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what can be claimed, but rather as descriptions of features that can be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

accessing measurement data that characterize one or more petrophysical features at a range of depths inside a reservoir, wherein the measurement data are from more than one well locations at the reservoir;

generating a filtered measurement dataset, comprising:

detecting anomalous measurement data points by computing, for each measurement data point, a likelihood value using a probability density function based on a mean and a covariance matrix of the one or more petrophysical features, and identifying measurement data points having a likelihood value below a predetermined threshold; and automatically removing the anomalous measurement data points;

identifying a plurality of layers along the range of depths of the reservoir based on the filtered measurement dataset;

within each layer of the plurality of layers, assigning, using a machine learning algorithm, filtered measurement data points corresponding to the layer among a plurality of clusters that are non-overlapping, wherein the clusters are determined based on the one or more petrophysical features of the measurement data, each cluster corresponding to a flow unit that identifies a volume of the reservoir based on one or more of flow potential and rock quality;

generating a three-dimensional (3D) permeability model of the reservoir based on the flow units of each layer from the plurality of layers, wherein the 3D permeability model comprises grid blocks assigned petrophysical feature values, with flow units allocated to the grid blocks based on the assigned petrophysical feature values; and simulating a performance of the reservoir based on the 3D permeability model.

2. The computer-implemented method of claim 1, wherein the one or more petrophysical features comprise: a permeability, a porosity, a water saturation, a rock-type, and a vertical heterogeneity.

3. The computer-implemented method of claim 1, further comprising:

comparing the 3D permeability model with internal architectures derived from mercury injection capillary pressure (MICP) experiments on core samples extracted from the more than one well locations; and adjusting the plurality of layers and the plurality of clusters such that a difference between the 3D permeability model and the internal architectures is reduced.

4. The computer-implemented method of claim 1, wherein the machine learning algorithm determines the plurality of clusters, each having a centroid, and wherein a distance from the measurement data to the centroid of each cluster is substantially reduced.

5. The computer-implemented method of claim 4, wherein the machine learning algorithm comprises: a K-means clustering algorithm.

6. The computer-implemented method of claim 1, further comprising:

determining a number for the plurality of clusters based on overlaying available data from a special core analysis (SCA) on the measurements data.

7. The computer-implemented method of claim 6, wherein the SCA generates at least one of: a relative permeability, or a capillary pressure.

8. The computer-implemented method of claim 1, further comprising:

associating the measured data grouped among the plurality of clusters with the more than one well locations such that the 3D permeability model covers the more than one well locations.

9. The computer-implemented method of claim 1, further comprising:

determining a water saturation height function for each cluster within each layer based on the machine learning algorithm; and incorporating the water saturation height function for each cluster into the 3D permeability model of the reservoir.

10. A computer system comprising one or more processors configured to perform operations of:

accessing measurement data that characterize one or more petrophysical features at a range of depths inside a reservoir, wherein the measurement data are from more than one well locations at the reservoir;

generating a filtered measurement dataset, comprising:

detecting anomalous measurement data points by computing, for each measurement data point, a likelihood value using a probability density function based on a mean and a covariance matrix of the one or more petrophysical features, and identifying measurement data points having a likelihood value below a predetermined threshold; and automatically removing the anomalous measurement data points;

identifying a plurality of layers along the range of depths of the reservoir based on the filtered measurement dataset;

within each layer of the plurality of layers, assigning, using a machine learning algorithm, filtered measurement data points corresponding to the layer among a plurality of clusters that are non-overlapping, wherein the clusters are determined based on the one or more petrophysical features of the measurement data, each cluster corresponding to a flow unit that identifies a volume of the reservoir based on one or more of flow potential and rock quality;

generating a three-dimensional (3D) permeability model of the reservoir based on the flow units of each layer from the plurality of layers, wherein the 3D permeability model comprises grid blocks assigned petrophysical feature values, with flow units allocated to the grid blocks based on the assigned petrophysical feature values; and simulating a performance of the reservoir based on the 3D permeability model.

11. The computer system of claim 10, wherein the one or more petrophysical features comprise: a permeability, a porosity, a water saturation, a rock-type, and a vertical heterogeneity.

12. The computer system of claim 10, wherein the operations further comprise:

comparing the 3D permeability model with internal architectures derived from mercury injection capillary pressure (MICP) experiments on core samples extracted from the more than one well locations; and adjusting the plurality of layers and the plurality of clusters such that a difference between the 3D permeability model and the internal architectures is reduced.

13. The computer system of claim 10, wherein the machine learning algorithm determines the plurality of clusters, each having a centroid, and wherein a distance from the measurement data to the centroid of each cluster is substantially reduced.

14. The computer system of claim 13, wherein the machine learning algorithm comprises: a K-means clustering algorithm.

15. The computer system of claim 10, further comprising:

determining a number for the plurality of clusters based on overlaying available data from a special core analysis (SCA) on the measurements data.

16. The computer system of claim 15, wherein the SCA generates at least one of: a relative permeability, or a capillary pressure.

17. The computer system of claim 10, wherein the operations further comprise:

associating the measured data grouped among the plurality of clusters with the more than one well locations such that the 3D permeability model covers the more than one well locations.

18. The computer system of claim 10, wherein the operations further comprise:

determining a water saturation height function for each cluster within each layer based on the machine learning algorithm; and incorporating the water saturation height function for each cluster into the 3D permeability model of the reservoir.

* * * * *